United States Patent
Ono et al.

(10) Patent No.: US 9,952,646 B2
(45) Date of Patent: Apr. 24, 2018

(54) POWER-SAVING MODE FOR VEHICLE INFORMATION DISPLAY APPARATUS

(71) Applicant: Mitsubishi Electric Corporation, Tokyo (JP)

(72) Inventors: Hiroyuki Ono, Tokyo (JP); Hiroshi Aizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 14/862,207

(22) Filed: Sep. 23, 2015

(65) Prior Publication Data

US 2016/0334853 A1    Nov. 17, 2016

(30) Foreign Application Priority Data

May 13, 2015    (JP) .................................. 2015-097840

(51) Int. Cl.
  *G09G 3/00* (2006.01)
  *G06F 1/32* (2006.01)
  *B60K 35/00* (2006.01)

(52) U.S. Cl.
  CPC ............ *G06F 1/3212* (2013.01); *B60K 35/00* (2013.01); *G06F 1/3231* (2013.01);
  (Continued)

(58) Field of Classification Search
  CPC ...... B60K 2350/1056; B60K 2350/106; B60K 2350/1064; B60K 2350/1068;
  (Continued)

(56) References Cited

U.S. PATENT DOCUMENTS 6,052,646 A * 4/2000 Kirkhart ................. G01C 21/26
                                                        342/357.74
6,526,335 B1 * 2/2003 Treyz ..................... G01C 21/26
                                                        307/10.1
(Continued)

FOREIGN PATENT DOCUMENTS

JP         8-121294 A       5/1996
JP         10309962 A       11/1998
(Continued)

OTHER PUBLICATIONS

Communication dated Aug. 17, 2016, issued by the Japan Patent Office in corresponding Japanese Application No. 2015-097840.

(Continued)

*Primary Examiner* — Darlene M Ritchie
(74) *Attorney, Agent, or Firm* — Sughrue Mion, PLLC; Richard C. Turner

(57) ABSTRACT

A vehicle information display apparatus that shortens an activation waiting time is obtained. The vehicle information display apparatus includes a display unit that displays vehicle information utilized in a vehicle and a control unit that controls contents displayed on the display unit; the control unit makes display control for the vehicle information operate in a power-saving mode where functions are limited, when the trigger signal is detected, and makes the display control for the vehicle information operate in a normal mode where functions are not limited, when the engine has been started completely.

7 Claims, 4 Drawing Sheets

(52) U.S. Cl.
CPC .......... *G06F 1/3262* (2013.01); *G06F 1/3265* (2013.01); *G09G 3/00* (2013.01); *B60K 2350/352* (2013.01); *G06F 1/3206* (2013.01); *G09G 2330/021* (2013.01); *G09G 2330/026* (2013.01); *G09G 2380/10* (2013.01); *Y02B 60/1242* (2013.01); *Y02B 60/1289* (2013.01); *Y02B 60/1292* (2013.01); *Y02B 60/32* (2013.01)

(58) Field of Classification Search
CPC .... B60K 2350/1072; B60K 2350/1096; B60K 2350/352; B60K 2350/355; B60K 35/00; B60K 37/02; B60K 37/04; B60Q 1/0017; B60Q 1/0023; B60Q 3/10; G01C 21/26; G01D 11/28; G01D 7/06; G06F 1/3212; G06F 1/30; G06F 1/26; G06F 1/263; G06F 1/266; G06F 1/28; G06F 1/305; G06F 1/3203; G06F 1/3206; G06F 1/3209; G06F 1/3265; G06F 9/4416; G06F 9/4418; G06F 9/442; G06F 1/3231; G06F 1/3262; G09G 3/00; G09G 2330/021; G09G 2330/026; G09G 2380/10; H04N 5/23241; B60R 16/023; Y02B 60/1242; Y02B 60/32; Y02B 60/1289; Y02B 60/1292; Y02B 60/1278; Y02B 60/1282; Y02B 60/121
See application file for complete search history.

(56) References Cited

U.S. PATENT DOCUMENTS

| | | | | |
|---|---|---|---|---|
| 6,720,938 | B2* | 4/2004 | Ohkawara | G09G 5/00 340/903 |
| 8,341,391 | B2* | 12/2012 | Choi | H04N 5/50 345/211 |
| 8,755,951 | B2* | 6/2014 | Liu | G01C 21/3688 340/438 |
| 9,132,806 | B2* | 9/2015 | De Los Santos | H04L 67/125 |
| 9,649,999 | B1* | 5/2017 | Amireddy | B60R 16/023 |
| 2007/0052703 | A1* | 3/2007 | Seto | G06T 1/60 345/419 |
| 2009/0187781 | A1* | 7/2009 | Gronemeier | G06F 1/305 713/340 |
| 2010/0121570 | A1* | 5/2010 | Tokue | B60R 11/0211 701/532 |
| 2010/0235087 | A1* | 9/2010 | Mimura | G01C 21/26 701/533 |
| 2011/0022264 | A1* | 1/2011 | Conan | B60R 25/20 701/36 |
| 2012/0056736 | A1* | 3/2012 | Katoh | B60K 35/00 340/439 |
| 2013/0054998 | A1* | 2/2013 | Wyatt | G06F 1/3265 713/323 |
| 2013/0156457 | A1* | 6/2013 | Tsukahara | H04N 1/00896 399/75 |
| 2013/0213344 | A1* | 8/2013 | Stender | F02D 45/00 123/198 D |
| 2013/0282226 | A1* | 10/2013 | Pollmann | B60Q 1/50 701/29.1 |
| 2013/0285445 | A1* | 10/2013 | Melzl | G06F 1/28 307/10.1 |
| 2014/0229727 | A1* | 8/2014 | Jun | G06F 9/4418 713/2 |
| 2015/0262545 | A1* | 9/2015 | Kneuper | G06F 3/0488 345/4 |
| 2016/0142575 | A1* | 5/2016 | Yokoyama | H04N 1/00896 358/1.15 |
| 2016/0360106 | A1* | 12/2016 | Kurosaki | H04N 5/23241 |
| 2017/0205246 | A1* | 7/2017 | Koenig | G01C 21/3682 |

FOREIGN PATENT DOCUMENTS

| | | |
|---|---|---|
| JP | 2000-179394 A | 6/2000 |
| JP | 2003-148308 A | 5/2003 |
| JP | 2003159960 A | 6/2003 |
| JP | 2003312314 A | 11/2003 |
| JP | 2005306193 A | 11/2005 |
| JP | 4206921 B2 | 1/2009 |
| JP | 2010-210406 A | 9/2010 |

OTHER PUBLICATIONS

Communication dated May 10, 2016 from the Japanese Patent Office issued in corresponding Application No. 2015-097840.

* cited by examiner

POWER-SAVING MODE FOR VEHICLE INFORMATION DISPLAY APPARATUS

BACKGROUND OF THE INVENTION

Field of the Invention

The present invention relates to a vehicle information display apparatus that provides information to a user and particularly to a vehicle information display apparatus that shortens a user's activation waiting time.

Description of the Related Art

As its function is highly advanced, a vehicle information display apparatus is equipped with an operating system and the like; thus, it takes a long time to activate it, as is the case with a car navigation apparatus; as a result, a user may have a feeling of irritation.

Moreover, a vehicle information display apparatus works as an instrument cluster. Meanwhile, in a conventional instrument cluster, all warning lamps are turned on when an engine is started and then the lamps for functions in good order are turned off. Therefore, in the case when an engine is started, if the vehicle information display apparatus has not been activated, the user has a feeling of irritation. Furthermore, a vehicle information display apparatus that performs a display function after the engine has been started indicates a delayed warning to the user, in comparison with a conventional instrument cluster.

To date, there have been known technologies that shorten the activation waiting time of a liquid-crystal device mounted in a vehicle (e.g., refer to Patent Document 1). In a conventional technology, a car navigation apparatus is triggered to be activated by locking a vehicle door while the screen thereof is dark, and then the display of the screen is started the moment the engine key switch is turned on.

[Patent Document 1] Japanese Patent No. 4206921

However, because when an engine is started, the starter activation current is large, the voltage drop across a battery mounted in the vehicle becomes large; thus, in the case where the display of the screen is started the moment the engine key switch is turned on or in the case where the vehicle information display apparatus is made to perform normal operation (the state where all functions can be utilized) when the engine key switch is turned on or immediately after the engine key switch has been turned on, the apparatuses mounted in the vehicle are reset. In order to prevent the reset, hardware measures are conceivable in which, for example, the battery capacity is increased or capacitors for preventing the reset are mounted in the power-supply circuits of the apparatuses; however, the cost increases. Moreover, especially, in a two-wheeled vehicle or the like, the mounting space is limited; thus, it is desirable that the hardware is downsized as much as possible.

Furthermore, it does not pose any problem even when a car navigation apparatus cannot be utilized immediately after the engine has been started; however, a instrument cluster is required to display the warning lamps and the engine speed immediately after the engine has been started. In the case where it is required to start the vehicle immediately after the engine has been started, vehicle information items such as the warning lamp, the fuel amount, the engine speed, the vehicle speed, and the like need to be displayed; therefore, the screen left being dark poses a problem.

SUMMARY OF THE INVENTION

The present invention solves the foregoing problems, shortens the activation waiting time of a vehicle information display apparatus, and provides a vehicle information display apparatus that is hardly reset when the engine is started.

A vehicle information display apparatus according to the present invention is provided with a display unit that displays vehicle information utilized in a vehicle and a control unit that controls contents displayed on the display unit; in a vehicle information display apparatus that is activated by a trigger signal to be detected before a vehicle engine is started, the control unit makes display control for the vehicle information operate in a power-saving mode where functions are limited, when the trigger signal is detected, and makes the display control for the vehicle information operate in a normal mode where functions are not limited, when the engine has been started completely.

The present invention makes it possible to activate a vehicle information display apparatus before the engine is started; thus, the activation waiting time after the engine has been started can be shortened. Moreover, because the vehicle information display apparatus can be activated in the power-saving mode where functions are limited, the activation time can be shortened. Furthermore, when the engine is started, the vehicle information display apparatus enters the power-saving mode so that the voltage drop at a time when the engine is started is reduced; thus, even when a reset prevention circuit is provided in the vehicle information display apparatus, it is made possible to reduce the cost and to downsize the circuit.

The foregoing and other objects, features, aspects, and advantages of the present invention will become more apparent from the following detailed description of the present invention when taken in conjunction with the accompanying drawings.

DETAILED DESCRIPTION OF THE INVENTION

Embodiment 1

Figure 1:
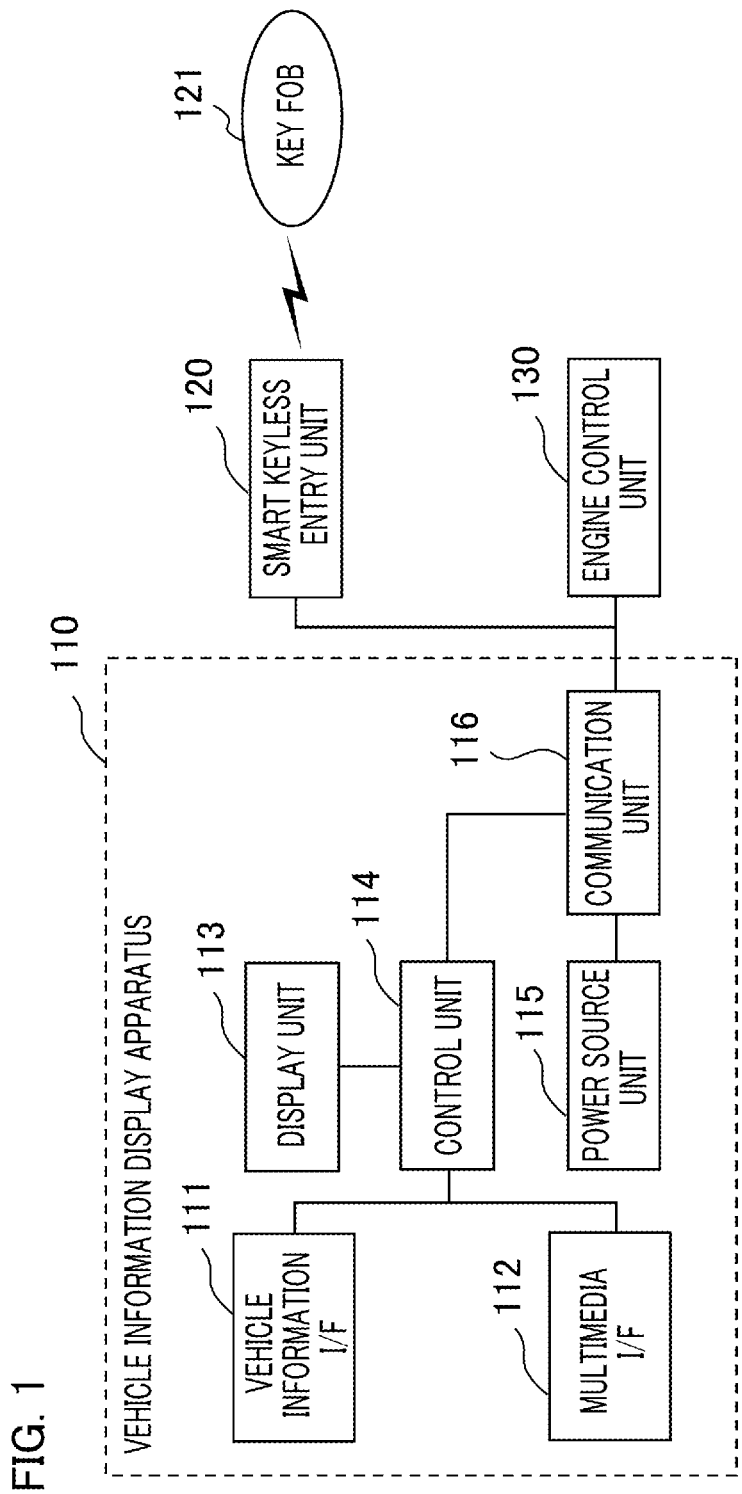
FIG. 1 is a block diagram representing the system configuration of a vehicle information display apparatus according to Embodiment 1 of the present invention.

FIG. 1 is a block diagram representing the system configuration of a vehicle information display apparatus according to the present invention. As represented in FIG. 1, a vehicle information display apparatus 110 includes a vehicle information I/F (interface, the same applies hereinafter) 111, a multimedia I/F 112, a display unit 113, a control unit 114, a power source unit 115, and a communication unit 116.

The vehicle information I/F 111 denotes an input/output unit for vehicle information items such as a winker on/off input and a head light on/off input.

The multimedia I/F 112 denotes, for example, a unit that performs a button function or a touch panel function for operating the vehicle information display apparatus 110 and the function of a camera mounted on a vehicle. The multimedia I/F 112 also denotes a unit that functions, for example, as a USB for connecting an electronic device such as a smart phone or an SD card for inputting or outputting data of Bluetooth (a registered trademark), which is a short-distance radio communication technology (a specification) for connecting a Wi-Fi (a registered trademark), a head set, and the like.

The display unit 113 is a unit that functions, for example, as a color liquid-crystal display for providing information to a user.

The control unit 114 is a unit that functions, for example, as a program for making a CPU, a ROM, a RAM, and the vehicle information display apparatus 110 operate. In the flowchart in FIG. 2, described later, the processing items from initializing processing in the step S203 to the normal mode in the step S210 are performed by the control unit 114. In other words, an engine start completion detection means is included in the control unit 114.

The power source unit 115 has a function of supplying a power source, for example, to the vehicle information display apparatus 110 and starts the supply of power source in response to a signal from the outside. As the signal from the outside, in addition to a physical switch, communication data of the communication unit 116 is imagined. In addition, there is included a circuit for preventing the vehicle information display apparatus from being reset due to a voltage drop at a time when the engine is started. In the flowchart in FIG. 2, described later, the activation in the step S202 relates to the power source unit 115; a signal from the communication unit 116 activates the power source unit 115, so that a power source is supplied to the whole vehicle information display apparatus 110.

The communication unit 116 is supplied with a power source other than the power source that is supplied to the whole vehicle information display apparatus 110. That is to say, the communication unit 116 can independently work; when the communication unit 116 receives communication data, power-source supply to the whole vehicle information display apparatus 110 can be started. The communication unit 116 includes a communication function (e.g., CAN: Controller Area Network) of communicating with a smart keyless entry unit 120 and an engine control unit 130. The communication unit 116 transmits data items such as an engine speed and a vehicle speed to the control unit 114. The control unit 114 and the communication unit 116 communicate with each other through serial communication or the like. In the flowchart in FIG. 2, described later, the step S201 corresponds to the processing by the communication unit 116; when the communication unit 116 receives a trigger signal through the CAN, the step S201 is followed by the step S202 where the activation processing is implemented.

Such vehicle information as inputted by use of the vehicle information I/F 111 may be received, for example, through communication with the smart keyless entry unit 120 and the engine control unit 130. As far as the vehicle speed and the like to be obtained through communication are concerned, information therefore may be acquired by way of the vehicle information I/F 111.

The smart keyless entry unit 120 includes a function of performing radio communication with a key fob 121 and then determining whether or not the key fob 121 is a registered one. The engine control unit 130 includes a function of controlling fuel injection and ignition so as to control the engine. Each of the smart keyless entry unit 120 and the engine control unit 130 is connected with the vehicle information display apparatus 110 through the CAN or the like and includes a function of communicating with the vehicle information display apparatus 110.

The vehicle information display apparatus 110 according to Embodiment 1 is configured in such a manner as described above; the vehicle information display apparatus 110 obtains information through the vehicle information I/F 111 or the multimedia I/F 112 and then displays the information on a screen so as to provide the information to a user. The information to be displayed includes, for example, a vehicle speed, an engine speed, mileage, a gear, a warning lamp, and the like; thus, the vehicle information display apparatus 110 functions as an instrument cluster. On top of that, it is made possible to display a camera image from a camera mounted on the vehicle; in addition, the vehicle information display apparatus 110 is connected with a smart phone or the like so that music information, a map, and the like can be displayed.

Figure 2:
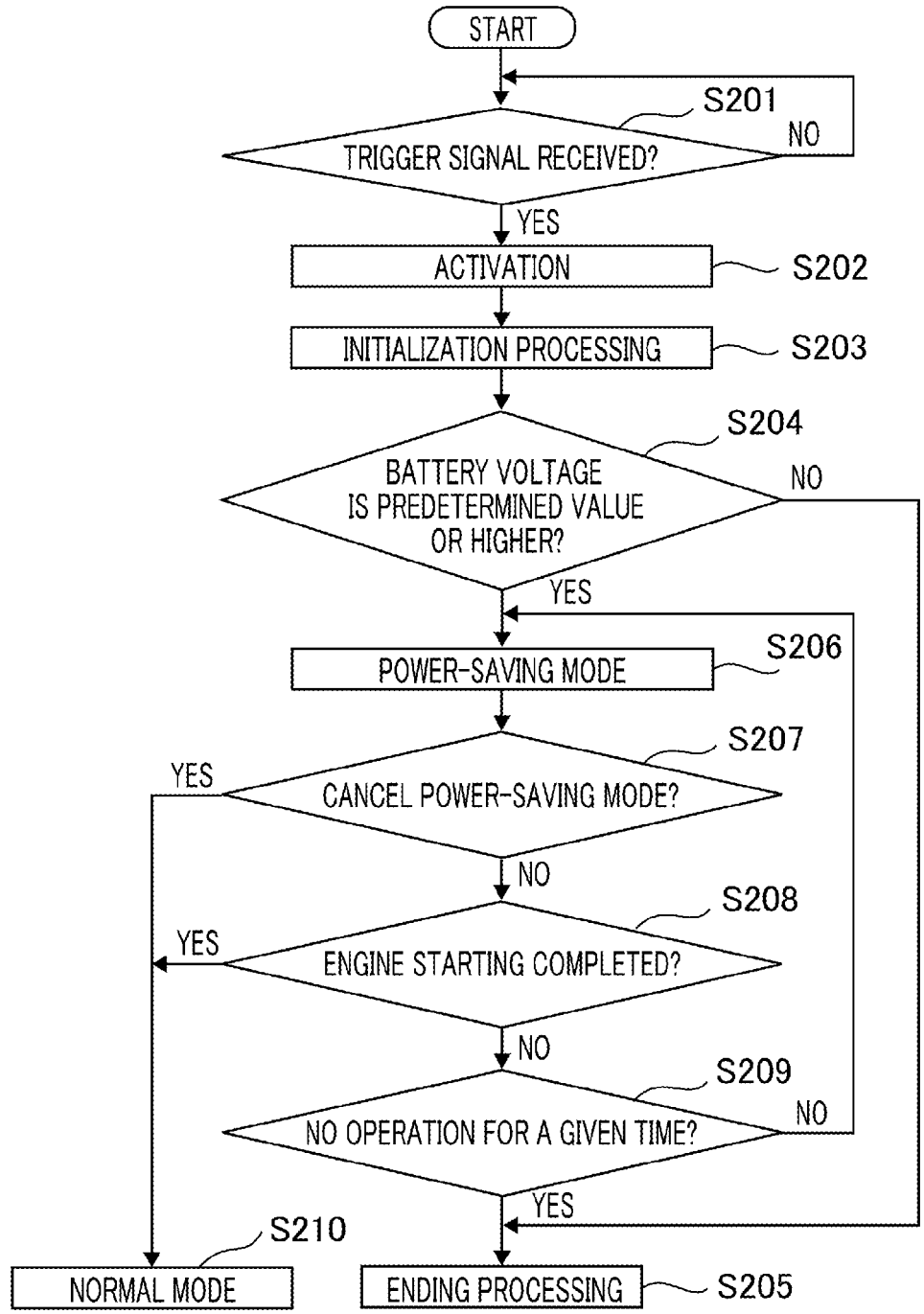
FIG. 2 is a flowchart representing the flow of operation processing at a time when the vehicle information display apparatus according to Embodiment 1 of the present invention is activated.

FIG. 2 represents the flow at a time when the vehicle information display apparatus 110 according to the present invention is activated.

At first, in the step S201, it is determined whether or not a trigger signal has been received. The step S201 is held until the trigger signal is received. The trigger signal in Embodiment 1 is a signal to be transmitted by means of communication such as the CAN from the smart keyless entry unit 120 to the vehicle information display apparatus 110 when the key fob 121 approaches the smart keyless entry unit 120. In other words, the communication unit 116 has a function as a trigger detection means that detects the trigger signal produced prior to starting operation of the engine. When the registered key fob 121 approaches the smart keyless entry unit 120 mounted in the vehicle, the smart keyless entry unit 120 transmits the trigger signal to the vehicle information display apparatus 110. Because the communication unit 116 is supplied with a power source other than the power source that is supplied to the whole vehicle information display apparatus 110, only the communication unit 116 can independently work; when the communication unit 116 receives data, the power-source supply to the whole vehicle information display apparatus 110 is started.

As described above, the fact that the user has approached the vehicle is utilized as a trigger so that the vehicle information display apparatus 110 is preliminarily activated; as a result, the user's waiting time can be shortened.

After the trigger signal has been received in the step S201, activation processing is implemented in the step S202. When the communication unit 116 receives communication data as a trigger signal, the power source unit 115 starts to supply the vehicle information display apparatus 110 with a power source, and then the vehicle information display apparatus 110 is activated in the step S202.

After the vehicle information display apparatus 110 has been activated, initialization processing is started in the step S203. In the initializing processing, which is so-called boot processing, hardware and software are initialized. As its function is highly advanced, a vehicle information display apparatus is equipped with an operating system and the like and hence the time for initializing processing tends to become longer; therefore, it is useful to shorten the waiting time.

After the initialization processing has been completed, it is determined in the step S204 whether or not the battery voltage is the same as or higher than a predetermined value. In the case where the battery voltage is the same as or higher than the predetermined voltage, the vehicle information display apparatus is operated in the power-saving mode in the step S206. In the case where the battery voltage is lower than the predetermined voltage, the step 204 is followed by the step S205 of ending processing, where the power source for the vehicle information display apparatus 110 is turned off. Because when the battery voltage is lower than the predetermined value, the operation of the vehicle information display apparatus 110 is ended, it is made possible to prevent the vehicle information display apparatus 110 from being reset when the engine is started, and hence it is also made possible to prevent the battery from being exhausted entirely. When the step 204 is followed by the ending processing, the engine starts and then the power source is supplied to the vehicle information display apparatus 110, so that the vehicle information display apparatus 110 is activated.

As described above, the battery voltage is monitored before the engine is started, and in the case where the battery voltage value is low, the power source for the vehicle information display apparatus 110 is turned off; thus, it is made possible to prevent the vehicle information display apparatus 110 from being reset when the engine is started. Moreover, the startability of the engine can be improved. In the case where the battery voltage value is extremely low and the vehicle information display apparatus 110 is left activated, the vehicle information display apparatus 110, which consumes much electric power, may be reset, depending on the performance of the reset prevention circuit; in addition to that, the startability is deteriorated. When the vehicle information display apparatus 110, which has been activated, is reset, the user may be irritated. Therefore, when the battery voltage value is extremely low, the power source for the vehicle information display apparatus 110 is turned off; as a result, it is made possible to prevent the vehicle information display apparatus 110 from being reset and hence irritating the user.

In the power-saving mode, only the instrument cluster display function is made effective and the brightness is set to be low so that the power consumption is suppressed. Other functions, for example, Wi-Fi, Bluetooth, USB, and the like are made ineffective. When only as few functions as needed are made effective, it is possible to suppress the voltage from dropping when the engine is started; thus, the reset prevention circuit of the vehicle information display apparatus 110 can be downsized and hence the cost thereof can be reduced.

When in the step S207, the user cancels the power-saving mode or when in the step S208, starting of the engine is completed after the vehicle information display apparatus 110 has entered the power-saving mode, the normal mode, which is the step S210, follows the power-saving mode. In addition, in the case when the vehicle information display apparatus 110 is in the power-saving mode of the step S209, the engine is started or the user does not operate the vehicle information display apparatus 110 for a given time or long, the step S209 is followed by the step S205 of ending processing. In the case when the vehicle information display apparatus 110 is in the power-saving mode, any case other than the above occurs, the determination in the step S207, S208, or S209 is continued while the vehicle information display apparatus 110 remains in the power-saving mode.

The step S207 is useful when the user desires to utilize any function other than the instrument cluster display function before the engine starts. The user can select the step S207 by use of the display unit 113 and a touch panel as the multimedia I/F 112. Because as described above, the user can cancel the power-saving mode, the vehicle information display apparatus 110 can be utilized even before the engine is started. For example, in the case where the vehicle information display apparatus 110 has a function of enabling a vehicle instruction manual and the like to be read and the user wants to perform maintenance or in the case where the vehicle information display apparatus 110 has a function of displaying vehicle travel data, as a chart, and the user wants to check the data while keeping the vehicle stopped, the vehicle information display apparatus 110 can be utilized without starting the engine. Moreover, as described above, the step S208 is useful for downsizing the reset prevention circuit and for reducing the cost thereof. Furthermore, the step S209 is useful for the case when the user does not utilize the vehicle information display apparatus 110, the power source therefore is turned off so that the vehicle information display apparatus 110 is prevented from working and hence the battery is prevented from being exhausted entirely.

In this situation, it is assumed that in the step S208, the condition for determining that the engine has been started completely is the fact that the engine speed has exceeded a predetermined value. From the value of the engine speed, it is determined whether or not the engine has been started completely. The foregoing determination can be implemented because the engine speed at a time when the engine autonomously rotates is higher than the engine speed at a time when the engine rotates through a starter. For example, when the engine speed is the same as or higher than 1000 r/min, it is determined that the engine has been started completely. It may be allowed that a determination time is added to the condition, for example, when the engine speed of 1000 r/min or higher has been kept for 100 ms, it is determined that the engine has been started completely. In other words, the control unit 114 has a function as the engine start completion detection means that detects completion of engine starting, based on engine speed information from the communication unit 116.

Moreover, it may be allowed that the condition for determining that the engine has been started completely is the fact that after the operation of starting the engine, the battery voltage value has exceeded a predetermined value.

Figure 3:
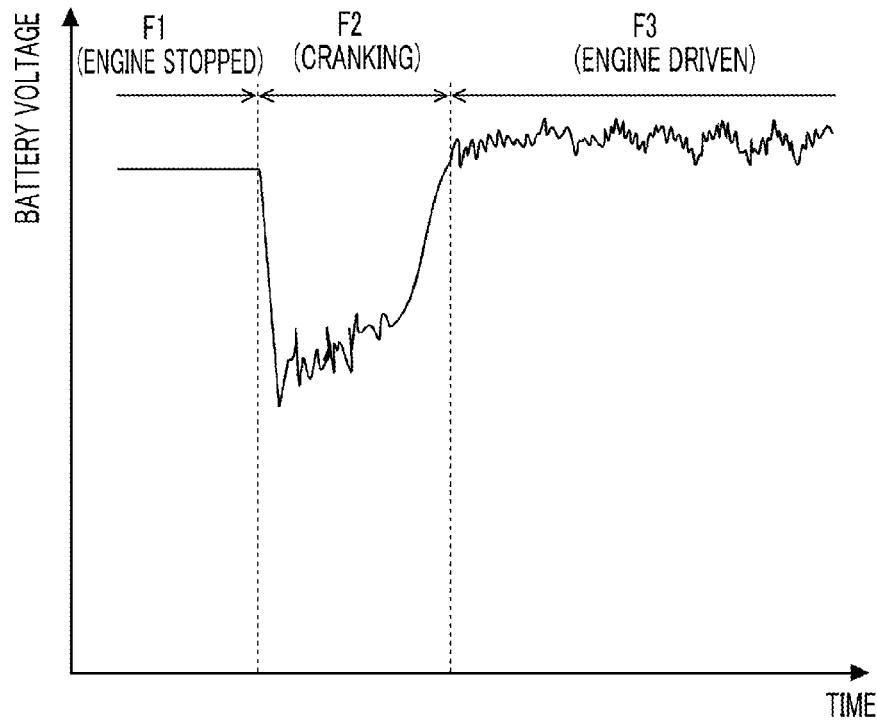
FIG. 3 is a graph representing a change in the value of a battery voltage according to Embodiment 1 of the present invention.

FIG. 3 is a graph representing the behavior of the battery voltage at a time when the engine is started. As represented in FIG. 3, in the state where the engine is not driven, i.e., in the engine stopping state F1, the battery voltage is almost constant; in the engine driving state F3, the battery voltage value changes due to the effects of charging and an electric load. In Embodiment 1, the voltage change is utilized in the determination. When the engine is being driven, the battery voltage value changes in a short period; therefore, for example, the maximum value and the minimum value of the battery voltage in a period of 100 ms are retained and when the value obtained by subtracting the minimum value from the maximum value is the same as or larger than 0.1 V, it can be determined that the engine has been started completely. It may be allowed that the number of establishments of the foregoing condition is added to the condition for determining the completion of engine starting; for example, in the case where the condition that the difference between the maximum value and the minimum value of the battery voltage in a period of 100 ms is the same as or larger than 0.1 V is satisfied thrice in 500 ms, it is determined that the engine has been started completely. In the cranking state F2, the battery voltage changes as represented in FIG. 3.

Figure 4:
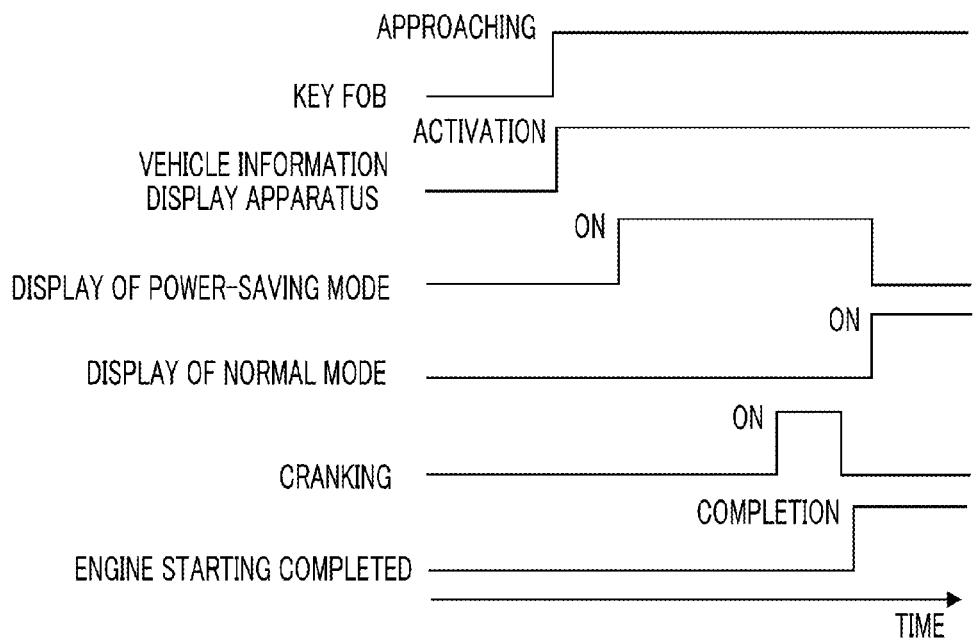
FIG. 4 is a chart representing the operation timing at a time when the vehicle information display apparatus according to Embodiment 1 of the present invention is activated.

FIG. 4 is a timing chart for explaining the processing items in the flow chart in FIG. 2. FIG. 4 is a timing chart at a time when the engine has been started completely in the step S208 and then the step S208 is followed by the step S210 of the normal mode.

In Embodiment 1, when a user having the key fob 121 approaches a vehicle equipped with the smart keyless entry unit 120, the vehicle information display apparatus 110 is activated. After the initialization processing has been completed, the vehicle information display apparatus 110 is operated in the power-saving mode where the number of functions is limited. When after the engine starting operation, the engine has been started completely, the power-saving mode is followed by the normal mode. In the power-saving mode, the number of functions is limited; however, in the normal mode, all the functions can be utilized.

Even when the configuration of the foregoing embodiment is changed to the following one, the present invention can also demonstrate the same effect.

That is to say, the trigger signal in the step S201 may be not communication data through the CAN but a signal that directly turns on a power supply relay in the vehicle information display apparatus 110. The smart keyless entry unit 120 may be integrated in the vehicle information display apparatus 110. The foregoing configuration reduces the number of units and functions that are to be activated periodically or constantly; therefore, the power consumption in the whole vehicle can be suppressed and hence the battery can be prevented from being exhausted entirely.

With regard to the initialization processing in the step S203, it may be allowed that in order to shorten the activation time in the power-saving mode and in order to suppress the power consumption at a time before the engine has been started completely, only the functions that are utilized in the power-saving mode are initialized and then the initialization processing for the remaining functions are implemented after the power-saving mode is followed by the normal mode; alternatively, it may be allowed that in order to shorten the activation time in the normal mode, the initialization processing for the remaining functions are implemented in the power-saving mode. In addition, the initialization processing for all of the functions may be implemented in the step S203.

Figure 5:
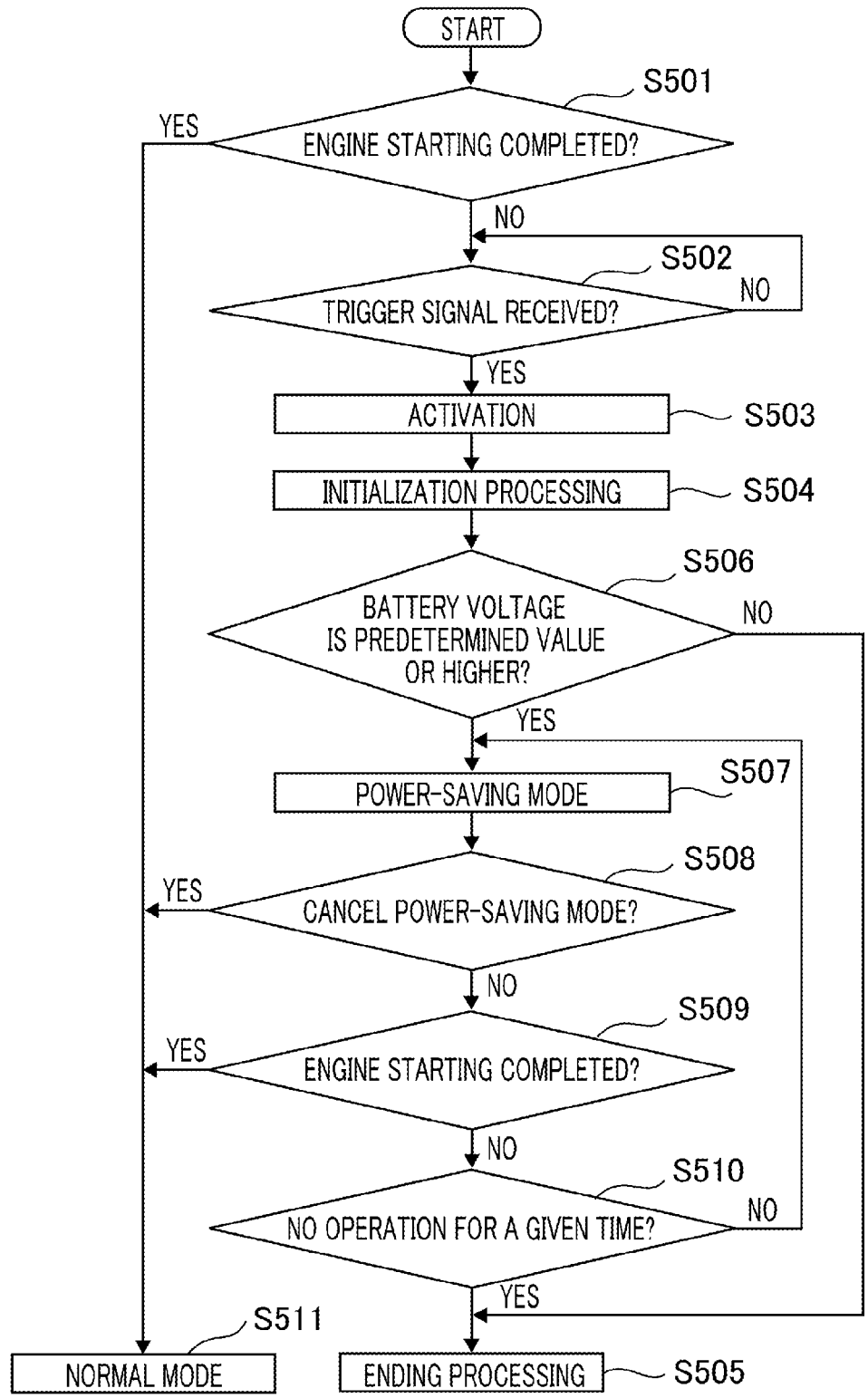
FIG. 5 is a flowchart representing the flow of operation processing at a time when the vehicle information display apparatus according to Embodiment 1 of the present invention is activated.

In the processing flow represented in FIG. 2, as determined in the step S204 or S209, the vehicle information display apparatus 110 may be stopped before the engine has been started completely or the vehicle information display apparatus 110 may be activated at a time of cranking. In that case, in order to quickly activate the vehicle information display apparatus 110 in the normal mode, it may be allowed that as represented in the flowchart in FIG. 5, it is determined, before the normal mode is followed by the power-saving mode, whether or not the engine has been started completely so that the normal mode can be selected without passing through the power-saving mode. In other words, the determination as to whether or not the engine has been started completely is implemented in the step S501; in the case where the engine has been started completely is implemented, the normal mode of the step S511 is immediately selected. It may be allowed that the determination in the step S501 as to whether or not the engine has been started completely is implemented by the communication unit 116 that has received through the CAN data indicating the completion of engine starting and then the vehicle information display apparatus 110 is activated. In addition, the vehicle information display apparatus 110 may be activated by use of a physical switch. In the case of FIG. 5, in the normal mode of the step S511, it is determined whether or not the initialization processing has been completed; in the case where the initialization processing has been completed, the initialization processing to be implemented in the step S504 may be omitted in the step S511. The steps S502 through S511 in FIG. are the same as the steps S201 through S210 in FIG. 2; therefore, the explanation therefore will be omitted. Moreover, the determination as to whether or not the engine has been started completely may be periodically implemented in a task other than the flow in FIG. 2 or the like.

With regard to the power-saving mode of the step S206, a user may change the functions that can be utilized in the power-saving mode.

Cancellation of the power-saving mode of the step S207 may be implemented not by use of a touch panel but by a button mounted on the vehicle information display apparatus 110 or in a vehicle or by the key fob 121.

In the step S209, in the case where the vehicle information display apparatus 110 is not operated by a user for a given time of longer, the vehicle information display apparatus 110 is stopped; the given time may be changed by the user.

The determination, based on the engine speed, as to whether or not the engine has been started completely may be implemented by the vehicle information display apparatus 110, which is adapted to receive data on the engine speed through communication; alternatively, it may be allowed that the engine control unit 130 implements the determination, based on the engine speed, and then the result thereof is received by the vehicle information display apparatus 110 through communication. With regard to the determination based on the battery voltage value, it may be allowed that through the vehicle information I/F 111, vehicle information is inputted and then the determination is implemented; alternatively, it may be allowed that the engine control unit 130 or the smart keyless entry unit 120 implements the determination and then the vehicle information display apparatus 110 receives the result thereof as communication data.

The embodiment of the present invention may appropriately modified or omitted within the spirit and scope of the present invention.

Various modifications and alterations of this invention will be apparent to those skilled in the art without departing from the scope and spirit of this invention, and it should be understood that this is not limited to the illustrative embodiments set forth herein.

What is claimed is:
1. A vehicle information display apparatus comprising:
a display unit that displays vehicle information utilized in a vehicle; and
a central processing unit (CPU) having a program stored thereon that controls contents displayed on the display unit,
wherein the vehicle information display apparatus is activated by a trigger signal,
wherein the CPU controls the display unit to operate in a power-saving mode in which only a portion of functions are made effective, when the trigger signal is detected, the portion of functions including an instrument cluster display,
wherein the CPU controls the display unit to operate in a normal mode where additional functions are made effective, when the engine has been started completely, wherein the CPU controls the display unit to operate in the normal mode without passing through the power-saving mode, when the engine has been started completely before the trigger signal is detected, wherein, when the trigger signal is detected and before the engine has been started completely, only components related to the portion of functions that are made effective in the power-saving mode are initialized, and wherein, when the power-saving mode is followed by the normal mode, additional components related to the additional functions that are made effective in the normal mode are initialized.

2. The vehicle information display apparatus according to claim 1, wherein the CPU cancels the power-saving mode before the engine has been started.

3. The vehicle information display apparatus according to claim 1, wherein when the vehicle information display apparatus is working in the power-saving mode and the voltage across the battery mounted in the vehicle is the same as or lower than a predetermined value, the CPU can end the power-saving mode.

4. The vehicle information display apparatus according to claim 1, wherein a determination condition, based on which the CPU determines that the engine has been started completely, is the fact that the rotation speed of the engine exceeds a predetermined value.

5. The vehicle information display apparatus according to claim 4, wherein a determination condition, based on which the CPU determines that the engine has been started completely, is the fact that the determination condition continues for a predetermined time.

6. The vehicle information display apparatus according to claim 1, wherein a determination condition, based on which the CPU determines that the engine has been started completely, is the difference between a voltage value of a battery, mounted in the vehicle, at a time before the engine is started and a voltage value of the battery at a time after the engine has been started.

7. The vehicle information display apparatus according to claim 6, wherein a determination condition, based on which the CPU determines that the engine has been started completely, is the fact that the determination condition continues for a predetermined time.

* * * * *